United States Patent [19]

Riegel et al.

[11] Patent Number: 5,440,618
[45] Date of Patent: Aug. 8, 1995

[54] SYSTEM FOR CHECKING THE ACCESS TO THE DATA OF A DATA UNIT

[75] Inventors: Maximilian Riegel, Nürnberg; Charlotte Ramsteck, Kalchreuth; Hans-Joachim Haber, Nürnberg, all of Germany

[73] Assignee: U. S. Philips Corporation, New York, N.Y.

[21] Appl. No.: 254,455

[22] Filed: Jun. 6, 1994

Related U.S. Application Data

[63] Continuation of Ser. No. 941,002, Sep. 8, 1992, abandoned.

[30] Foreign Application Priority Data

Sep. 11, 1991 [DE] Germany .................. 41 30 123.4

[51] Int. Cl.⁶ .......................................... H04M 11/00
[52] U.S. Cl. ...................................... 379/95; 379/93; 379/106
[58] Field of Search .............. 379/95, 94, 93, 96, 379/97, 98, 57, 212, 216, 106, 107; 340/825.31, 825.34

[56] References Cited

U.S. PATENT DOCUMENTS

| | | | |
|---|---|---|---|
| 3,984,637 | 10/1976 | Caudill et al. | 379/95 |
| 4,679,226 | 7/1987 | Muehleisen | 379/95 |
| 4,763,350 | 8/1988 | Immendorfer et al. | 379/216 |
| 4,763,351 | 8/1988 | Lipscher et al. | 379/95 |
| 4,837,805 | 6/1989 | Okumura | 379/95 |
| 4,847,890 | 7/1989 | Solomon et al. | 379/212 |
| 4,922,521 | 5/1990 | Krikke et al. | 379/95 |
| 4,922,522 | 5/1990 | Scanlon | 379/95 |
| 4,995,109 | 2/1991 | Arizumi et al. | 379/95 |
| 5,115,466 | 5/1992 | Presttun | 379/95 |
| 5,315,634 | 5/1994 | Tanaka et al. | 379/57 |

FOREIGN PATENT DOCUMENTS 0046650  3/1985  Japan ................................. 379/95

Primary Examiner—Curtis Kuntz
Assistant Examiner—Jason Chan
Attorney, Agent, or Firm—Michael J. Balconi-Lamica; Anne E. Barschall

[57] ABSTRACT

In a system for checking the access to data of a data unit (T10, T20, T30), the data unit is connected to a public network (V2) and is capable of exchanging data with a second subscriber (T4) over this network. In order that an authorized subscriber has access to the data of the data unit even without a secret telephone number, an adapter (T15, T25, T35) is allocated to the data unit (T10, T20, T30), which adapter can be dialled over a secured network (V1). The adapter (T15, T25, T35) is arranged in such a way that, in response to being dialled over the secured network (V1), the adapter causes the data unit (T10, T20, T30) to dial the second subscriber (T4) whose telephone number is stored in a memory (T11, T21, T31) allocated to data unit.

5 Claims, 1 Drawing Sheet

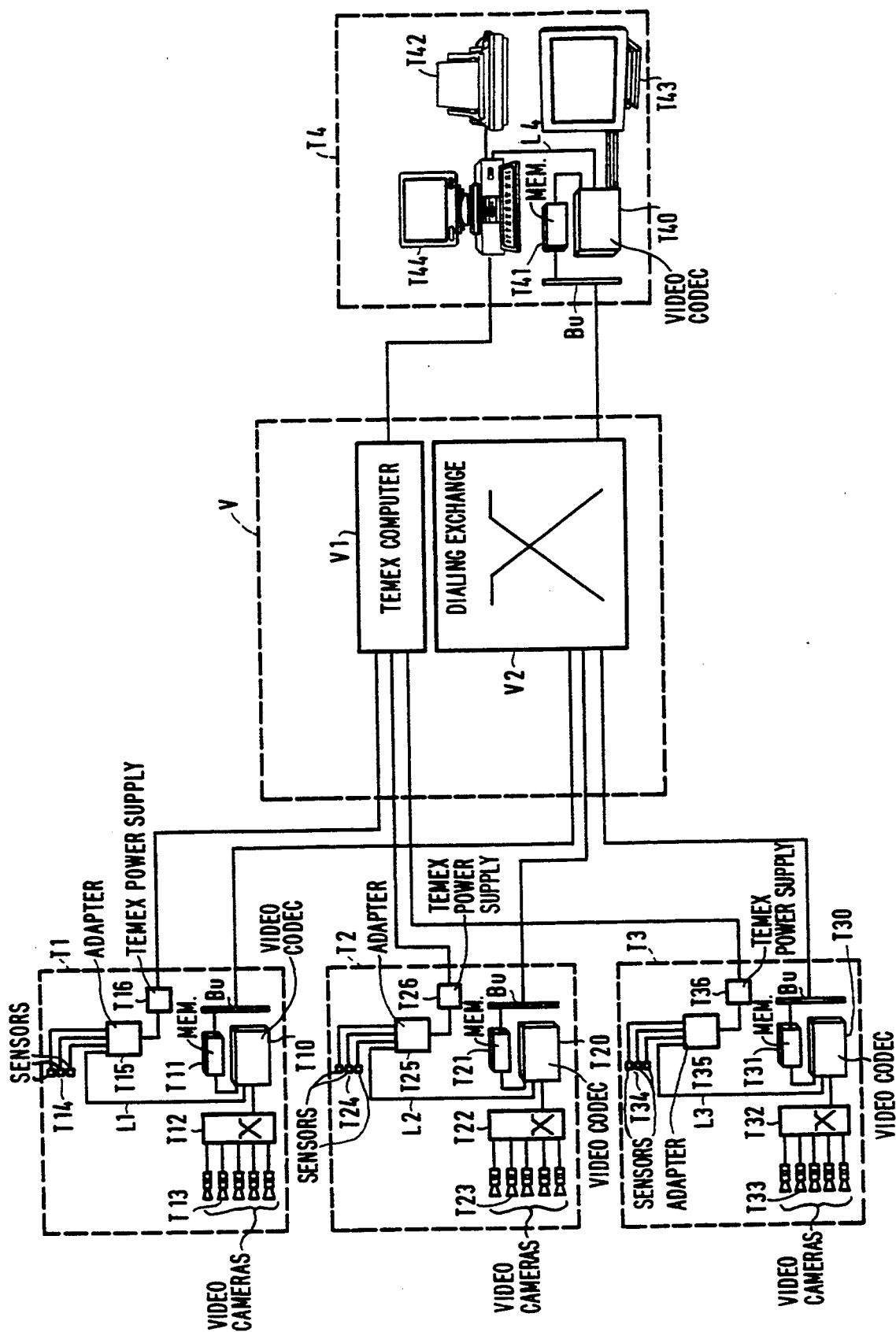

SYSTEM FOR CHECKING THE ACCESS TO THE DATA OF A DATA UNIT

This is a continuation of application Ser. No. 07/941,002, filed on Sep. 8, 1992, now abandoned.

The invention relates to a system for checking the access to the data of a data unit arranged for connection to a public network and for data exchange with a second subscriber over this network.

BACKGROUND OF THE INVENTION

Systems of this type are known. A data bank is mentioned here as an example, whose data can be transmitted to the subscriber over a public network. A requirement for the access to the data of the data bank is that the subscriber has dialled the data bank's telephone number and his own customer number or secret number.

Due to the secret number—usually—only an authorized subscriber has access to the data of the data bank. This provides for a certain check. However, this check is not sufficient for security-sensitive data, because systematic computer-aided continuous attempts with secret numbers have already "hacked" so many a data bank and computer, as is widely known.

SUMMARY OF THE INVENTION

It is an object of the invention to provide for a system of the type mentioned in the opening paragraph, in which the access to security-sensitive data of a data unit is not checked by means of secret numbers which can be transmitted over a public network.

This object is achieved by means of the following measures: An adapter which can be dialled via a secured network is allocated to the data unit, the adapter is arranged in such a way that, once it has been dialled, it causes the data unit to dial the second subscriber. These measures provide for protection against unauthorized access to the data produced by the data unit and also to the data applied to the data unit.

Advantageous embodiments of the invention are stated in the dependent claims.

BRIEF DESCRIPTION OF THE DRAWINGS

The invention will be further explained with reference to the drawing FIGURE which represents a block diagram of an exemplary embodiment of the invention.

DETAILED DESCRIPTION OF THE PREFERRED EMBODIMENTS

The drawing FIGURE shows three identically arranged subscribers T1, T2 and T3 which can be connected to a fourth subscriber T4 by way of a local exchange V. The connection from the three subscribers T1, T2 and T3 to the subscriber T4 is realized over two GPO telecom networks, namely the TEMEX network and the ISDN network.

TEMEX is a service of the German Post Office TELEKOM for the transmission of telecontrol information signals. It is used, for example, for reporting alerts. Therefore, the subscribers T1, T2 and T3 comprise sensors T14, T24 and T34 whose data are transferred by way of TEMEX adapters T15, T25 and T35. Each adapter is followed by a TEMEX power supply unit T16, T26 and T36 which is connected to a TEMEX computer V1 in the public exchange via a point-to-point line. The point-to-point line changes its state only when the associated TEMEX adapter has an alert to be transmitted. By a return channel from the TEMEX computer V1 to one of the adapters T15, T25 or T35, simple instructions can be transmitted by the TEMEX computer V1 which instructions are encoded with a binary variable. Switching on or off a heating system may here be mentioned as an example.

The TEMEX computer V1 combines the data of the point-to-point lines to a multiplex signal and transfers this signal to the fourth subscriber T4 which is a central monitoring position. The central monitoring position can give binary encoded instructions for a specific subscriber T1, T2 or T3 to the TEMEX computer V1 by a return line. The messages and commands are processed by a computer T44 of the central monitoring position T4 and a protocol of them is made, as required, on a printer T42.

By the lines of the ISDN network the video codecs T10, T20 and T30 can be connected as data units to a video codec T40 by way of a dialling exchange V2. Before the data are transferred, for example, to buses Bu (So-connection), they are adapted to the ISDN network by means of an adapter comprising telephone number memories T11, T21, T31 and T41. Also the data which are necessary for setting up a connection and are to be transmitted to the exchange V2 in the case of a connection request, pass through the adapter.

The subscribers T1, T2 and T3 are equipped each with five video cameras T13, T23 and T33 for monitoring objects. The cameras can be connected to the associated video codec T10, T20 or T30 by way of a coupling network T12, T22 or T32. Via the connection line between the coupling network and the associated video codec both the coupling network and the position of the cameras can be adjusted.

By means of an ISDN telephone number the subscriber T1, for example, can be dialled from the central monitoring position, but its codec T10 is programmed in such a way that the codec does not supply data in that case.

Neither would any other subscriber of the ISDN network receive any data from the subscriber T1 if he called him. The knowledge of these data could, for example, make known which objects were monitored and thus provide useful information to unauthorized parties.

In order that the central monitoring position T4 receives the video data from the subscriber T1, T2 or T3 without using a secret number, a connection is realized between the TEMEX network and the ISDN network by way of bidirectional lines L1, L2, L3 and L4. Via the connection line L1, L2 or L3, when the central monitoring position T4 gives an instruction over the TEMEX network, the adapter T15, T25 or T35 is caused to dial the central monitoring position T4 by means of the telephone number stored in the memory of the adapter concerned. The transmission of the instruction is equal to a dialling of the subscriber T1, T2 or T3 over the TEMEX network. Once the connection has been established between one of the subscribers T1, T2 or T3 and the central monitoring position T4 over the ISDN network, the video data of the codec T10, T20 or T30 are transmitted, decoded by the codec T40, displayed on a monitor T43 or calculated by means of the computer T44.

From the central monitoring position T4 it is then also possible to transmit control signals to the cameras and, for example, change the adjustment of the cameras;

it is likewise possible to modify parameters of the codecs by remote control.

Even if an unauthorized user succeeded over the TEMEX network in causing the video codecs to transmit security-sensitive data, these data would be transmitted to the central monitoring position T4 as a result of the stored telephone number in the adapter.

We claim:

1. A system for checking access via a public network to data of a data unit by a subscriber station, comprising:
   (a) the data unit,
   (b) the subscriber station,
   (c) a secured data network connected to the data unit and the subscriber station,
   (d) the public network connected to the data unit and the subscriber station,
   (e) said data unit having an adaptor, said data unit being connected to the secured network via said adaptor, in response to the subscriber station making a dialed call via the secured network, the dialled call being to and received by the data unit, said adaptor causing the data unit to dial the subscriber station via the public network for establishing a connection between the data unit and the subscriber station for data exchange therebetween,
   wherein the data unit is a data bank, and the adaptor causes the data unit to dial without receiving a secret code unique to the subscriber station.

2. A system for checking access via a public network to data of a data unit by a subscriber station, comprising:
   (a) the data unit,
   (b) the subscriber station,
   (c) a secured data network connected to the data unit and the subscriber station,
   (d) the public network connected to the data unit and the subscriber station,
   (e) said data unit having an adaptor, said data unit being connected to the secured network via said adaptor, in response to the subscriber station making a dialed call via the secured network, the dialled call being to and received by the data unit, said adaptor causing the data unit to dial the subscriber station via the public network for establishing a connection between the data unit and the subscriber station for data exchange therebetween,
   wherein said data unit has a memory for storing the telephone number of the subscriber station, and
   wherein said data unit has a picture encoder for connection to the public network.

3. A method for gathering secured data from remote subscriber stations comprising the following steps:
   at a central subscriber station, initiating a first call over a first point to point line of a first, secured network;
   at a remote subscriber station, receiving the call over a second point to point line of the secured network,
   within the remote subscriber station, communicating, from a first adapter coupled to the second point to point line to a second adapter coupled to a second, public network, that the call has been received;
   within the remote subscriber station, initiating a second call via the public network to the central subscriber station;
   in the central subscriber station, receiving the second call; and
   providing the data from the remote subscriber station to the central subscriber station via the second call.

4. The method of claim 15 wherein the data is video data from a plurality of video cameras at the remote station.

5. A secured data monitoring system comprising:
   a central subscriber station including:
      means for initiating a first call along a secured network; and
      means for receiving a second call along a public network; and
   at least one remote subscriber station [(T1, T2, and T3)]including:
      means for gathering data;
      means for receiving the first call;
      means for initiating the second call in response to the first call; and
      means for providing the data to the central subscriber station via the second call;
   whereby the central subscriber station monitors data gathering at the remote subscriber station.

* * * * *